(12) United States Patent
Choi et al.

(10) Patent No.: US 12,479,879 B2
(45) Date of Patent: Nov. 25, 2025

(54) METHOD FOR PREPARING DISODIUM 5'-GUANYLATE HEPTAHYDRATE CRYSTAL

(71) Applicant: CJ CHEILJEDANG CORPORATION, Seoul (KR)

(72) Inventors: Jung Hwa Choi, Seoul (KR); Min Jong Kim, Seoul (KR); Chang Yub Oh, Seoul (KR); Hwa Yeon Lim, Seoul (KR); Seok Hyun Kang, Seoul (KR); Yu Shin Kim, Seoul (KR); Ji Hun Kang, Seoul (KR); Il Chul Kim, Seoul (KR); Jae Hun Yu, Seoul (KR)

(73) Assignee: CJ CHEILJEDANG CORPORATION, Seoul (KR)

( * ) Notice: Subject to any disclaimer, the term of this patent is extended or adjusted under 35 U.S.C. 154(b) by 872 days.

(21) Appl. No.: 17/766,633

(22) PCT Filed: Sep. 21, 2020

(86) PCT No.: PCT/KR2020/012693
§ 371 (c)(1),
(2) Date: Apr. 5, 2022

(87) PCT Pub. No.: WO2021/071130
PCT Pub. Date: Apr. 15, 2021

(65) Prior Publication Data
US 2024/0051984 A1    Feb. 15, 2024

(30) Foreign Application Priority Data

Oct. 8, 2019   (KR) ........................ 10-2019-0124774

(51) Int. Cl.
  *C07H 19/20*   (2006.01)
  *C07H 1/00*    (2006.01)

(52) U.S. Cl.
  CPC .............. *C07H 19/20* (2013.01); *C07H 1/00* (2013.01); *C07B 2200/13* (2013.01)

(58) Field of Classification Search
  CPC ........................ C07H 19/20; C07B 2200/13
  See application file for complete search history.

(56) References Cited

U.S. PATENT DOCUMENTS

| | | | |
|---|---|---|---|
| 3,190,877 A | 6/1965 | Joichi et al. | |
| 5,663,322 A | 9/1997 | Katayama et al. | |
| 6,673,576 B1 | 1/2004 | Usuda et al. | |
| 7,176,305 B2 | 2/2007 | Uchida et al. | |
| 8,309,329 B2 | 11/2012 | Asahara et al. | |
| 2016/0368938 A1 | 12/2016 | Shi et al. | |

FOREIGN PATENT DOCUMENTS

| | | |
|---|---|---|
| CN | 1861624 A | 11/2006 |
| CN | 1955189 A | 5/2007 |
| CN | 101654469 A | 2/2010 |
| CN | 101863943 A | 10/2010 |
| CN | 103570783 A | 2/2014 |
| CN | 108892699 A | 11/2018 |
| JP | 432753 B | 1/1943 |
| JP | H08193095 A | 7/1996 |
| JP | 2770470 B2 | 7/1998 |
| JP | 4742505 B2 | 5/2011 |
| JP | 2018524308 A | 8/2018 |
| KR | 1019870001571 B1 | 9/1987 |
| KR | 19910006318 A | 4/1991 |
| KR | 1019920004487 B1 | 6/1992 |
| KR | 1019950000259 B1 | 1/1995 |
| KR | 1019970003128 B1 | 3/1997 |
| KR | 100136902 B1 | 1/1998 |
| KR | 1020020092166 A | 12/2002 |
| KR | 100376635 B1 | 3/2003 |
| KR | 1020040045332 A | 6/2004 |
| KR | 100463983 B1 | 6/2005 |
| KR | 100965722 B1 | 6/2010 |
| WO | 2009107631 A1 | 9/2009 |
| WO | 2013168627 A1 | 11/2013 |

OTHER PUBLICATIONS

Nicoud, CrystEngComm, 2019, 21, 2105-2118. (Year: 2019).*
ChEBI: 132932, disodium 5'-guanylate, internet article dated 2016, https://www.ebi.ac.uk/chebi/searchId.do?chebiId=CHEBI:132932. (Year: 2016).*
Anh-Tuan Nguyen et al., Influence of salt additives on phase transformation of guanosine 5-monophosphate disodium in anti-solvent crystallization, 2013, pp. 82-87, Journal of Crystal Growth, Elsevier.
Korean Office Action for Application No. 10-2019-0124774 dated Dec. 15, 2020.
Korean Notice of Allowance for Application No. 10-2019-0124774 dated May 31, 2021.
International Search Report for Application No. PCT/KR2020/012693 dated Jan. 13, 2021.
Written Opinion for Application No. PCT/KR2020/012693 dated Jan. 13, 2021.
Patent Search Report for Application No. PCT/KR2020/012693 dated Dec. 9, 2022—Russian with English Translation; 4 pages.
RU Office Action for Patent Application No. 2022111071 dated December 9, 2022—Russian with English Translation; 14 pages.
Starikov A.Yu et al.; "Methods for obtaining crystals. Bulletin of the Council of Young Scientists and Specialists of the Chelyabinsk Region" 2018.
Extended European Search Report for Application No. EP20874856.6 dated Sep. 1, 2023.
Japanese Office Action for Application No. 2022-519193 issued Oct. 3, 2023, 10 pages, with English translation.

(Continued)

*Primary Examiner* — Layla D Berry
(74) *Attorney, Agent, or Firm* — CANTOR COLBURN LLP

(57) ABSTRACT

Provided is a method of preparing disodium 5'-guanylate heptahydrate crystals from an aqueous 5'-guanylic acid solution.

8 Claims, 3 Drawing Sheets

(56) References Cited

OTHER PUBLICATIONS

Reiaki Hirayama, Organic Compound Crystal Preparation Handbook, 2008, p. 17-23, 37-40, 45-51, and 57-65 (Partially Translated).
Australian Report No. 1 For Application No. 2020362582 Issued Mar. 22, 2023. 5 Pages.
First Chinese Office Action for Application No. 202080068733.2 Issued Mar. 22, 2023. 10 Pages.
Indian Office Action For Application No. 202217020682 Issued Date Apr. 18, 2023, 7 Pages.
Japanese Office Action for Application No. 2022519193 Issued Apr. 25, 2023. 10 Pages.
Japanese Office Action Dated Apr. 2, 2024 Issued in Corresponding Japanese Patent Application No. 2022-519193 (With Translation) (6 Pages).

* cited by examiner

METHOD FOR PREPARING DISODIUM 5'-GUANYLATE HEPTAHYDRATE CRYSTAL

TECHNICAL FIELD

The present disclosure relates to a method of preparing disodium 5'-guanylate heptahydrate crystals. In particular, the present disclosure relates to a method of obtaining disodium 5'-guanylate heptahydrate crystals by concentration crystallization without using an organic solvent.

BACKGROUND ART

Disodium 5'-guanylate crystals are generally known to have an amorphous form, a plate-like tetrahydrate form, and a pillar heptahydrate form. As it is difficult to separate amorphous form crystals via solid-liquid separation, transport, and store them, the heptahydrate form is mainly used in the industry.

A method of industrially obtaining the crystals employs a hydrophilic organic solvent such as methanol, ethanol, etc., which is an alcohol-based anti-solvent.

The crystallization method using an organic solvent leads to the crystals having residual hydrophilic organic solvent therein even after drying, which makes users feel anxious. In addition, it is necessary to obtain the organic solvent with high-purity in a process of recovering the hydrophilic organic solvent used in the process, requiring high costs including investment for a distillation column and related utility costs, and explosion-proof costs for workers' safety are generated.

Accordingly, the present inventors have conducted experiments to improve the above method, and have found that disodium 5'-guanylate heptahydrate crystals may be obtained without using an organic solvent, thereby completing the present disclosure.

DESCRIPTION OF EMBODIMENTS

Technical Problem

An aspect provides a method of preparing disodium 5'-guanylate heptahydrate crystals, the method including mixing an aqueous salt solution and an aqueous 5'-guanylic acid solution to form amorphous solids in a mixed solution; and adding seed crystals to the mixed solution to form disodium 5'-guanylate heptahydrate crystals, wherein the adding of the seed crystals is performed while maintaining the temperature at 25° C. to 45° C.

Solution to Problem

An aspect provides a method of preparing disodium 5'-guanylate heptahydrate crystals, the method including mixing an aqueous salt solution and an aqueous 5'-guanylic acid solution to form amorphous solids in a mixed solution; and adding seed crystals to the mixed solution to form disodium 5'-guanylate heptahydrate crystals, wherein the adding of the seed crystals is performed while maintaining the temperature at 25° C. to 45° C.

In the method, the aqueous salt solution may be at pH of 7 to 10. The adding may be performed while maintaining the temperature of the mixed solution at 25° C. to 45° C.

The aqueous salt solution may have any salt concentration so that it is mixed with the aqueous 5'-guanylic acid solution to form the mixed solution having a salt concentration of 160 g/L to 360 g/L. For example, the aqueous salt solution may be an aqueous salt solution of 200 g/L to 400 g/L.

The aqueous 5'-guanylic acid solution may be prepared by adding 5'-guanylic acid to water. The aqueous 5'-guanylic acid solution may be an aqueous 5'-guanylic acid solution of 50 g/L to 400 g/L. The aqueous 5'-guanylic acid solution may include a salt, for example, it may be an aqueous disodium 5'-guanylate solution. The aqueous 5'-guanylic acid solution may include those obtained by microbial culture. Those obtained by microbial culture may be a supernatant obtained by removing cells from a microbial culture including 5'-guanylic acid. Those obtained by microbial culture may be those obtained by purifying the supernatant using ion exchange chromatography or activated carbon. The purifying using activated carbon may include mixing activated carbon and the culture to allow impurities to bind to the activated carbon, and removing, from the mixture, the activated carbon to which impurities are bound.

In the method, the mixing of the aqueous 5'-guanylic acid solution may be performed until the salt concentration in the mixed solution becomes 160 g/L to 360 g/L. The mixing of the aqueous 5'-guanylic acid solution may be performed until the NaCl concentration in the mixed solution becomes 160 g/L to 360 g/L.

In the method, the forming of the amorphous solids may include drying the mixed solution such that the salt concentration becomes 160 g/L to 360 g/L. The mixing of the aqueous 5'-guanylic acid solution may include adding the aqueous solution in portions. The adding may be adding dropwise. The adding may be performed for 1 minute to 1000 minutes. The mixing of the aqueous 5'-guanylic acid solution may be performed under stirring.

As used herein, the term "amorphous solid" refers to a white solid that does not have any crystalline form like a crystal but is randomly precipitated. The amorphous solids float in a solution and have a non-transparent, irregular, and opaque shape, because they are amorphous. When this amorphous solid is dried, it may be identified as anhydride in analysis of hydrates thereof.

In the method, the adding of the seed crystals may be performed while maintaining the temperature of the mixed solution at 25° C. to 45° C. The seed crystals may include disodium 5'-guanylate heptahydrate crystals. The adding of the seed crystals may be performed while stirring a reactor. The adding of the seed crystals may be adding the crystals in portions. The adding may be adding dropwise. The adding may be performed for 1 minute to 1000 minutes. The amount of the seed crystals added may be based on the weight of 5'-guanylate in the mixed solution of the aqueous 5'-guanylic acid solution and the aqueous salt solution. The amount of the seed crystals added may be 0.1 part by weight to 5.5 parts by weight, or 0.1 part by weight to 5.0 parts by weight, based on 100 parts by weight of the 5'-guanylate. The 5'-guanylate may be, for example, disodium 5'-guanylate.

The method may further include cooling the solution including the formed crystals after forming the disodium 5'-guanylate heptahydrate crystals. The cooling may be performed at 25° C. or lower, for example, at 4° C. to 25° C., 4° C. to 20° C., 4° C. to 15° C., 4° C. to 10° C., 10° C. to 25° C., 15° C. to 25° C., or 10° C. to 20° C.

The method may further include separating the crystals from the solution including the formed crystals after forming the disodium 5'-guanylate heptahydrate crystals. The separating may be performed by centrifugation or filtration. The centrifugation may be performed at 100×g to 1000×g. The centrifugation may be performed for 1 minute to 30 minutes. The filtration may be performed using a filter of 0.22 μm to 200 μm.

In the method, the aqueous salt solution may be an aqueous solution of a metal salt. In other words, the salt of the aqueous salt solution may be a metal salt. The metal salt may include an alkaline metal salt. The alkaline metal salt may be a sodium-containing salt. The alkaline metal salt may be NaCl, KCl, $Na_2CO_3$, $NaHCO_3$, or $Na_2CO_3$.

An embodiment may provide a method of preparing disodium 5'-guanylate heptahydrate crystals, the method including forming amorphous solids in a mixed solution by mixing an aqueous salt solution and an aqueous 5'-guanylic acid solution such that the salt concentration in the mixed solution becomes 160 g/L to 360 g/L; and forming disodium 5'-guanylate heptahydrate crystals by adding seed crystals to the mixed solution, wherein the temperature of the mixed solution may be 25° C. to 45° C. The aqueous salt solution may be an aqueous salt solution of 200 g/L to 400 g/L. The aqueous 5'-guanylic acid solution may be an aqueous 5'-guanylic acid solution of 50 g/L to 400 g/L. The aqueous salt solution may be at pH of 7 to 10. The seed crystals may be disodium 5'-guanylate heptahydrate crystals. The aqueous 5'-guanylic acid solution may include those obtained by microbial culture. The aqueous 5'-guanylic acid solution may include a culture obtained by microbial culture, or a culture supernatant obtained by removing cells therefrom, or a 5'-guanylic acid purified therefrom. The microbe may be capable of producing 5'-guanylic acid. The amount of the seed crystals added may be 0.1 part by weight to 5.5 parts by weight, based on 100 parts by weight of 5'-guanylate formed in the mixed solution. The salt may be NaCl. The 5'-guanylate may be, for example, disodium 5'-guanylate.

An embodiment may provide a method of preparing disodium 5'-guanylate heptahydrate crystals, the method including forming amorphous solids in a mixed solution which is prepared by mixing an aqueous NaCl solution and an aqueous 5'-guanylic acid solution such that the salt concentration in the mixed solution becomes 160 g/L to 360 g/L; and forming disodium 5'-guanylate heptahydrate crystals by adding, to the mixed solution, disodium 5'-guanylate heptahydrate crystals as seed crystals in an amount of 0.1 to 5.5 parts by weight based on 100 parts by weight of 5'-guanylate formed in the mixed solution, wherein the temperature of the mixed solution may be 25° C. to 45° C. The aqueous salt solution may be an aqueous salt solution of 200 g/L to 400 g/L. The aqueous 5'-guanylic acid solution may be an aqueous 5'-guanylic acid solution of 50 g/L to 400 g/L. The aqueous salt solution may be at pH of 7 to 10. The aqueous 5'-guanylic acid solution may include those obtained by microbial culture. The aqueous 5'-guanylic acid solution may include a culture obtained by microbial culture, or a culture supernatant obtained by removing cells therefrom, or a 5'-guanylic acid purified therefrom. The microbe may be capable of producing 5'-guanylic acid. The amount of the seed crystals added may be 0.1 part by weight to 5.5 parts by weight, based on 100 parts by weight of 5'-guanylate.

Advantageous Effects of Disclosure

According to a method of preparing disodium 5'-guanylate heptahydrate crystals from an aqueous 5'-guanylic acid solution according to an aspect of the present disclosure, disodium 5'-guanylate heptahydrate crystals may be efficiently prepared from the aqueous 5'-guanylic acid solution.

Specifically, according to the method of preparing disodium 5'-guanylate heptahydrate of the present disclosure, disodium 5'-guanylate heptahydrate crystals may be obtained without adding an organic solvent. According to the preparation method of the present disclosure, it is advantageous in terms of a worker's safety problem that may be caused by the organic solvent, and final products do not include any residual organic solvent, thereby addressing end users' concerns about toxicity of the organic solvent. In addition, the method is economical because the investment for explosion-proof equipment and costs for maintenance of equipment, or investment for a distillation column and related utility costs for recovering organic solvents used with high purity, and utility cost used for process operation may be reduced.

MODE OF DISCLOSURE

Figure 1:
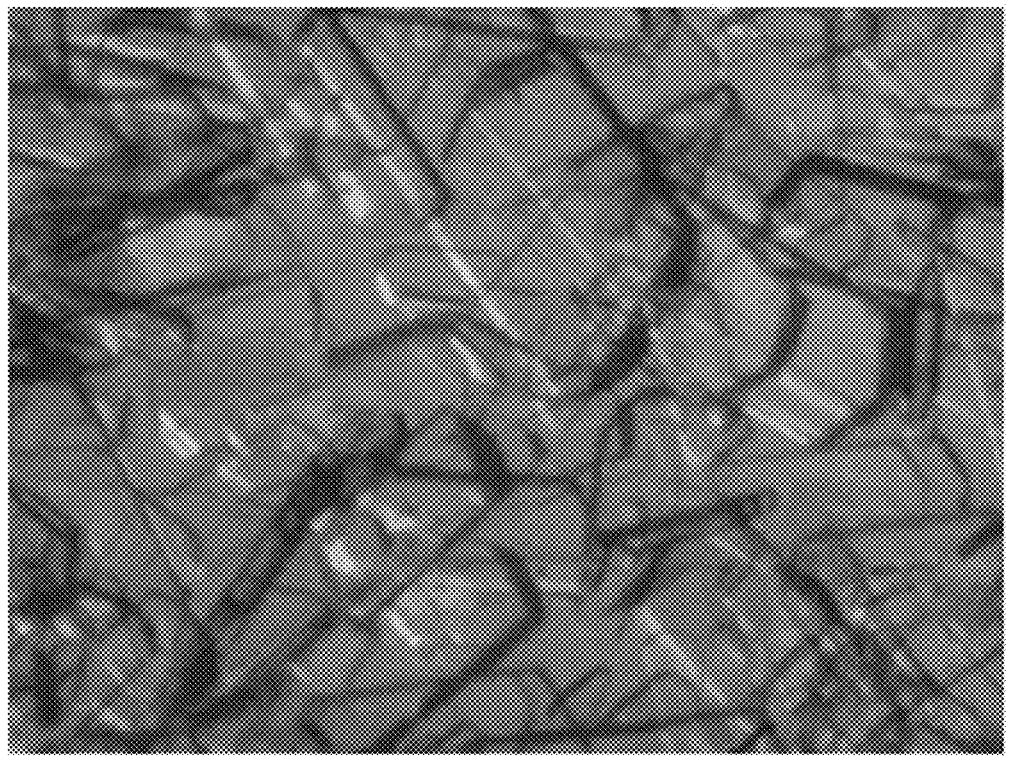
FIG. 1 shows an image of disodium 5'-guanylate heptahydrate crystals obtained according to Example 1, as photographed by a microscope.

Hereinafter, the present disclosure will be described in more detail with reference to Examples. However, Examples are only for illustrating the present disclosure, and the scope of the present disclosure should not be limited thereto.

Example 1

In the Example, disodium 5'-guanylate heptahydrate crystals were formed from an aqueous disodium 5'-guanylate solution without using an organic solvent, and isolated.

0.875 L of an 380 g/L aqueous solution of disodium 5'-guanylate was slowly added to 1 L of an 300 g/L aqueous solution of sodium chloride at pH of 9 and a temperature of 40° C. in a 3 L flask over 30 minutes. As a result, amorphous solids were formed in the mixed solution. In addition, the disodium 5'-guanylate was obtained by purifying a fermentation product including 5'-guanylic acid, which was obtained through the inventor's own microbial fermentation. pH of the 300 g/L aqueous solution of sodium chloride was adjusted using 2 mL of NaOH at a concentration of 50 (w/w) %. The amorphous solids were converted to disodium 5'-guanylate heptahydrate crystals at a sodium chloride concentration of 160 g/L in the mixed solution.

While maintaining the temperature of the mixed solution of the aqueous sodium chloride solution and the aqueous disodium 5'-guanylate solution at 42° C., disodium 5'-guanylate heptahydrate crystals as seed crystals were added to the solution in an amount of 1% by weight based on the weight of disodium 5'-guanylate formed in the mixed solution, followed by incubation under the same conditions. Within 1 hour after incubation, the amorphous solids were converted to pillar form disodium 5'-guanylate heptahydrate. As a result, the mixed solution was in the form of a slurry including crystals. The term "slurry" refers to a viscous suspension in which solid-phase crystals and a liquid are mixed. Hereinafter, the mixed solution including crystals is also referred to as a crystal slurry.

This shows that pillar form disodium 5'-guanylate heptahydrate may be formed by incubating the mixed solution of the aqueous sodium chloride solution and the aqueous 5'-guanylic acid solution in the presence of disodium 5'-guanylate heptahydrate as seed crystals. This shows that pillar form disodium 5'-guanylate heptahydrate may be formed by incubating the mixed solution without using an organic solvent. This constitutes a remarkable effect that would not have been expected by a person skilled in the art.

Next, after 1 hour of incubation, the temperature of the crystal slurry was naturally cooled to 25° C. or lower over two hours.

This crystal slurry was placed in a basket centrifuge H-110F (KOKUSAN Co. Ltd., Japan) and centrifuged at a bowl G-force of 340×g for 20 minutes. Following the centrifugation, the supernatant was removed to obtain a crystal slurry. 285 g of disodium 5'-guanylate heptahydrate crystals were obtained from the obtained crystal slurry.

The H-110F centrifuge has a perforated basket installed therein, and connected to an external rotation supply. The perforated basket is made of polyamide multifilament fiber filter fabric, and air permeability of the filter is 250 L/m²/s at 2 mbar. The filtered crystals were dried at room temperature for 24 hours.

The purity and concentration of the separated disodium 5'-guanylate heptahydrate crystals were analyzed using HPLC. Specifically, 1.0 g of the dried disodium 5'-guanylate heptahydrate crystal and disodium 5'-guanylate heptahydrate standard crystal (Sigma, ≥99.0 (w/w) % (HPLC)) were dissolved in 1 L of tertiary distilled water to prepare 1.0 g/L of Example and 1.0 g/L of standard solutions, respectively. The purity of disodium 5'-guanylate heptahydrate in the standard solution was confirmed by the standard reagent manufacturer's certificate. Thereafter, the concentration of disodium 5'-guanylate in the standard product was calculated by 1.0000 g/L×[purity of the standard product].

5 uL of Example solution and the standard solution were respectively loaded onto a column in an Agilent 1260 Infinity Quaternary LC (Agilent Technology Inc.) system. The column was Shiseido CAPCELL PAK C18 ACR (150 mm×4.6 mm, 3 um). Next, while applying to the column, 2% (v/v) acetonitrile/98% (v/v) phosphate buffer (pH 2.4) at a flow rate of 1 ml/min, absorbance at 254 nm was measured for an eluate flowing out. The phosphate buffer included 2 g/L of ammonium phosphate, 0.2 g/L of tetrabutyl ammonium phosphate, and 0.82 g/L of phosphoric acid. At this time, the temperature was 35° C. These HPLC conditions were also applied to measure the concentration of 5'-GMP in the filtrate. As a result, the purity was calculated according to the following formula.

Purity=Amount of 5'-GMP/Total weight of solids×100

In addition, 5 uL of the Example and the standard solution were respectively placed in a rectangular cell of CARY 100 UV-VIS (Agilent Technology Inc.) instrument, and transmittance at 420 nm was measured.

Consequently, dried disodium 5'-guanylate heptahydrate crystals were obtained by naturally drying the resulting crystal slurry at 25° C. for 12 hours. The dried crystals had a residual moisture content of 23.6 (w/v) %. The obtained dried disodium 5'-guanylate heptahydrate crystals had a weight of 261 g, a yield of 78.0%, and a purity of 95.0%. As specified for 5 (w/v) % aqueous crystal solution, transmittance (T) % was 95.0% and pH was 7.0 to 8.5.

FIG. 1 shows an image of the disodium 5'-guanylate heptahydrate crystals obtained according to Example 1, as photographed by a microscope. In FIG. 1, the disodium 5'-guanylate crystals were shown pillar, indicating that the crystals obtained according to Example 1 were disodium 5'-guanylate heptahydrate.

Comparative Example 1

Experiments were performed in the same manner as in Example 1, except that 1.3 L of the 380 g/L aqueous solution of disodium 5'-guanylate was added instead of 0.875 L, and the sodium chloride concentration in the mixed solution was 130.4 g/L. As a result, even though the seed crystals were added and observed for 6 hours, conversion of the amorphous solids to disodium 5'-guanylate heptahydrate was not observed. When the temperature of the mixed solution was slowly cooled to 25° C. or lower over two hours, the amorphous solids remained as they were, and thus they could not be separated by centrifugation using a basket separator.

Comparative Example 2

When 0.875 L of an 380 g/L aqueous solution of 5'-guanylate disodium was slowly added to 1 L of an 300 g/L aqueous solution of sodium chloride at a temperature of 40° C., of which pH was adjusted to 9 using 0.3 g of 5% NaOH, non-crystalline, i.e., amorphous crystals, were converted to plate-like tetrahydrate crystals at a sodium chloride concentration of 160 g/L. 1% by weight of seed crystals based on the weight of disodium 5'-guanylate was added to the mixed solution of the aqueous salt solution and the aqueous disodium 5'-guanylate solution, while maintaining the internal temperature of the mixed solution at about 52° C., and the crystal conversion was completed within 1 hour. However, the crystals obtained were not pillar-type heptahydrate crystals but plate-like tetrahydrate crystals.

Figure 2:
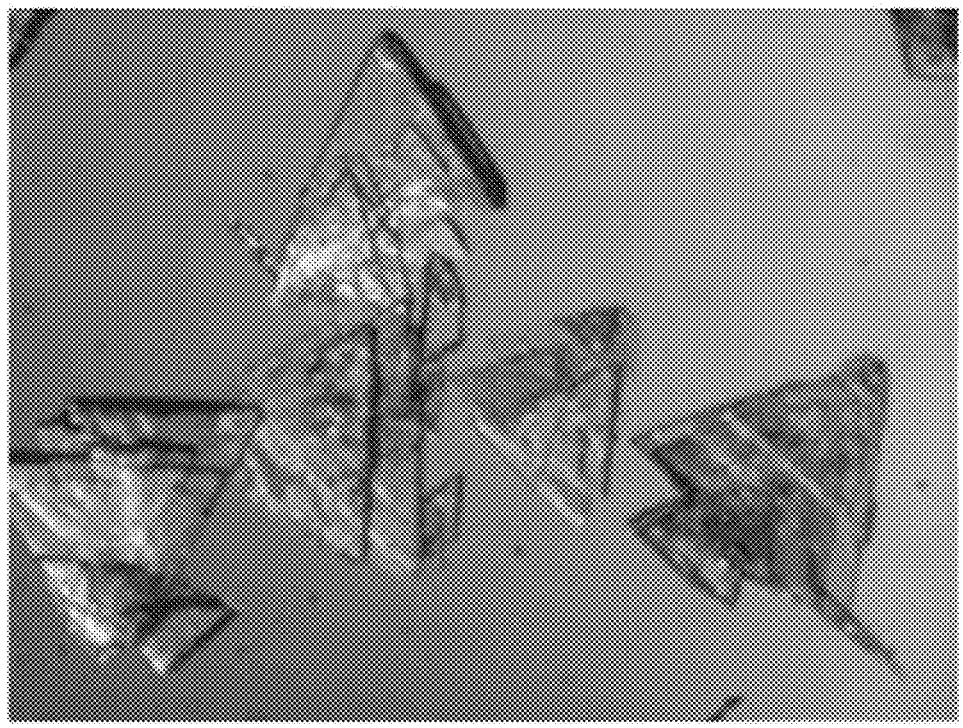
FIG. 2 shows an image of plate-like disodium 5'-guanylate tetrahydrate crystals obtained according to Comparative Example 2, as photographed by a microscope.

FIG. 2 shows an image of the plate-like disodium 5'-guanylate tetrahydrate crystals obtained according to Comparative Example 2, as photographed by a microscope.

Comparative Example 3: Crystal Prepared by Using Organic Solvent 4.4 g of $Na_2PO_4$ was added to and completely dissolved in 1.5 L of 200 g/L disodium 5'-guanylate solution, followed by stirring at 120 rpm at a temperature of 38° C. for 10 minutes to 20 minutes. After adding 0.2 L of methanol thereto at a flow rate of 3.4 ml per minute, disodium 5'-guanylate heptahydrate as seed crystals was added in an amount of 1% by weight based on the weight of disodium 5'-guanylate in the solution. When the system was completely equilibrated, 1 L of methanol was repeatedly used at 3.4 ml per minute for a total of 5 hours to obtain pillar crystals, whose weight was 259 g following dehydration thereof.

The resulting crystals were naturally dried at 25° C. for 12 hours to obtain dried disodium 5'-guanylate heptahydrate crystals. The dried crystals had a residual moisture content of 23.6 (w/v)/o.

Table 1 shows the amount of methanol used in the methods described in Example 1 and Comparative Example 3, purity of the disodium 5'-guanylate heptahydrate crystals produced thereby, and the methanol content remaining therein. In Table 1, the amount of methanol used is based on the 100 g of disodium 5'-guanylate heptahydrate obtained. In addition, the purity (%) of disodium 5'-guanylate heptahydrate was measured according to the method described in Example 1. The residual methanol content represents methanol remaining in the 5 (w/v) % crystal aqueous solution.

TABLE 1

|  | Amount of methanol used(g) | Purity of disodium 5'-guanylate heptahydrate (%) | Amount of residual methanol (ppm) |
|---|---|---|---|
| Comparative Example 3 | 270 | 95.06 | 850 |
| Example 1 | 0 | 95.00 | Not detected |

As shown in Table 1, the crystals of Example 1 maintained a purity of 95% or more, which was similar to that of Comparative Example 3.

In addition, in Comparative Example 3, 270 g of methanol was used as an organic solvent to obtain 100 g of disodium 5'-guanylate heptahydrate crystals, but no organic solvent was used in Example 1.

Figure 3:
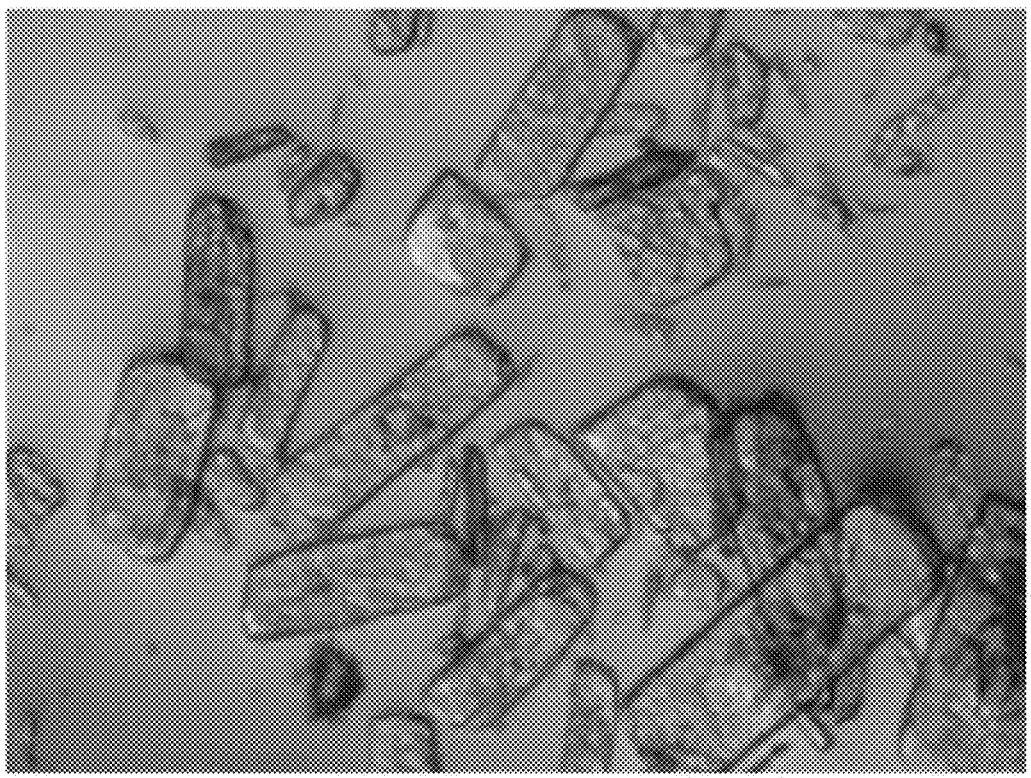
FIG. 3 shows an image of disodium 5'-guanylate heptahydrate crystals obtained by using methanol which is a hydrophilic organic solvent according to Comparative Example 3, as photographed by a microscope.

FIG. 3 shows an image of disodium 5'-guanylate heptahydrate crystals obtained by using methanol, a hydrophilic organic solvent according to Comparative Example 3, as photographed by a microscope.

Evaluation Example 1. Effect of Salt Concentration in Mixed Solution on Crystal Formation In this section, experiments were performed in the same manner as in Example 1, except that 400 g/L aqueous sodium chloride solution was used instead of 300 g/L aqueous sodium chloride solution, and different amounts of aqueous disodium 5'-guanylate solution were added so that the NaCl concentrations in the mixed solution were 120 g/L to 380 g/L.

As a result, amorphous solids or crystals formed in the mixed solution were observed through a microscope. The results are shown in Table 2.

TABLE 2

| Concentration of Sodium chloride (g/L) | Morphology of solid material | Conversion time (min) |
|---|---|---|
| 120 | Amorphous solid | — |
| 140 | Amorphous solid | — |
| 160 | Pillar form heptahydrate crystal | 30 |
| 200 | Pillar form heptahydrate crystal | 25 |
| 300 | Pillar form heptahydrate crystal | 25 |
| 360 | Pillar form heptahydrate crystal | 25 |
| 380 | Pillar heptahydrate crystal, but the crystal is small and mixed with sodium chloride | 25 |

As shown in Table 2, when the concentration of sodium chloride in the mixed solution was 160 g/L or more, the amorphous solid form of disodium 5'-guanylate was converted to heptahydrate. In the meantime, when the concentration of sodium chloride in the mixed solution exceeded 360 g/L, smaller crystals mixed with sodium chloride were obtained, making it difficult to separate disodium 5'-guanylate from the crystal slurry. The larger the crystal size is, the easier to separate the disodium 5'-guanylate crystals from the crystal slurry. As a result, in consideration of the results in Section 2 below, it was confirmed that disodium 5'-guanylate heptahydrate was formed at a salt concentration of 160 g/L to 360 g/L in the mixed solution.

Evaluation Example 2. Solubility of 5'-Guanylic Acid in Mixed Solution

With the aqueous 5'-guanylic acid solution added to different concentrations of aqueous sodium chloride solutions at temperature 40° C. and 25° C., the solubility of 5'-guanylic acid was examined.

Specifically, the aqueous 5'-guanylic acid solution was sufficiently dissolved in each of the aqueous sodium chloride solutions at 40° C. and 25° C., respectively, to prepare saturated solutions. As a result, 160 g/L to 360 g/L saturated solution of sodium chloride were prepared. As shown in Tables 3 and 4, sodium chloride crystals were precipitated in solutions including 400 g/L or more of sodium chloride in the mixed solution. Then, the concentrations (g/L) of 5'-guanylic acid in supernatants obtained by centrifuging each of the saturated solutions, i.e., the mixed solutions were measured.

Table 3 and Table 4 show the concentrations of disodium 5'-guanylate heptahydrate in aqueous sodium chloride solutions at 40° C. and 25° C., respectively.

TABLE 3

| | Sodium chloride Concentration (g/L) | | | | | | | | | |
|---|---|---|---|---|---|---|---|---|---|---|
| | 160 | 200 | 230 | 280 | 300 | 310 | 350 | 360 | 400 | higher than 400 |
| 5'-Guanylic acid concentration (g/L) in mixed solution | 86.5 | 62.7 | 57.1 | 50.1 | 49.9 | 49.5 | 48.9 | 49.8 | 49.6 Sodium chloride crystals precipitated | 48.7 Sodium chloride crystals precipitated |

TABLE 4

| | Sodium chloride Concentration (g/L) | | | | | | | | | |
|---|---|---|---|---|---|---|---|---|---|---|
| | 160 | 200 | 230 | 280 | 300 | 310 | 350 | 360 | 400 | 420 |
| Concentration of 5'-Guanylic acid in mixed solution (g/L) | 40.1 | 26.4 | 22.2 | 19.2 | 18.1 | 18.2 | 18.2 | 18.2 | 18.3 Sodium chloride crystals precipitated | 18.2 Sodium chloride crystals precipitated |

As shown in Tables 3 and 4, disodium 5'-guanylate heptahydrate was confirmed to have low solubility in each aqueous sodium chloride solution of 160 g/L to 360 g/L, for example, 160 g/L to 360 g/L. In the meantime, disodium 5'-guanylate heptahydrate was dissolved in each sodium chloride aqueous solution of less than 160 g/L without maintaining the pillar form.

Evaluation Example 3. Effect of Temperature of Mixed Solution on Crystal Formation To 1 L of an 300 g/L aqueous sodium chloride solution, of which pH was adjusted to 9 using 0.3 g of 5% NaOH, 0.875 L of an 380 g/L aqueous disodium 5'-guanylate solution was slowly added. In the mixed solution having the concentration of sodium chloride of 160 g/L and the concentration of disodium 5'-guanylate of 200 g/L, with the internal temperature thereof maintained as shown in Table 5 below, seed crystals were added in an amount of 1% by weight, based on the weight of disodium 5'-guanylate, while examined through a microscope for conversion of amorphous solids of sodium 5'-guanylate to heptahydrate crystals. Table 5 shows the crystals obtained according to the temperature of the mixed solution.

TABLE 5

| Temperature (° C.) | Crystal morphology | Conversion time (min) |
|---|---|---|
| 20 | Pillar heptahydrate crystal | 180 |
| 25 | Pillar heptahydrate crystal | 80 |
| 30 | Pillar heptahydrate crystal | 60 |
| 35 | Pillar heptahydrate crystal | 42 |
| 40 | Pillar heptahydrate crystal | 30 |
| 45 | Pillar heptahydrate crystal | 25 |
| 50 | plate-like tetrahydrate crystal | 30 |

As shown in Table 5, the conversion to pillar-type heptahydrate crystals was observed even at 20° C., but it took a while to convert. Rapid conversion of the amorphous solids to heptahydrate was observed from a temperature of 25° C. or higher. In the meantime, the amorphous solids were converted to tetrahydrate at a temperature of higher than 45° C.

Evaluation Example 4. Effect of Amount of Seed Crystal Added on Crystal Formation To 1 L of an aqueous 300 g/L sodium chloride solution, of which pH was adjusted to 9 using 0.3 g of 5% NaOH, 0.875 L of an aqueous 380 g/L disodium 5'-guanylate solution was slowly added. In the mixed solution, the concentration of sodium chloride was 160 g/L, the concentration of 5'-guanylic acid was 200 g/L, and the temperature of the mixed solution was 40° C.

After the amorphous solids were formed, seed crystals were added as shown in Table 6 below, and the crystal conversion rate was observed through a microscope. Table 6 shows the crystals according to the amount of seed crystals added to the mixed solution.

TABLE 6

| Weight of seed crystal (based on 100 parts by weight of sodium 5'-guanylate) | Crystal morphology | Conversion time (min) |
|---|---|---|
| 0.05 | Pillar heptahydrate crystal | 80 |
| 0.1 | Pillar heptahydrate crystal | 60 |
| 0.5 | Pillar heptahydrate crystal | 40 |
| 1.0 | Pillar heptahydrate crystal | 30 |
| 2.5 | Pillar heptahydrate crystal | 30 |
| 5.0 | Pillar heptahydrate crystal | 25 |
| 5.5 | Pillar heptahydrate crystal | 25 |

As shown in Table 6, as the amount of the seed crystals added increased, the time required for disodium 5'-guanylate converted from the amorphous solid to pillar heptahydrate tended to decrease. However, it was confirmed that when the amount of seed crystals added exceeded 5.0 parts by weight, the conversion time was no longer reduced.

The invention claimed is:

1. A method of preparing disodium 5'-guanylate heptahydrate crystals without using an organic solvent, the method comprising:
   mixing an aqueous salt solution and an aqueous 5'-guanylic acid solution to form amorphous solids in a mixed solution such that a salt concentration in the mixed solution is 160 g/L to 360 g/L, wherein the aqueous salt solution is an aqueous NaCl solution; and
   adding seed crystals to the mixed solution to form disodium 5'-guanylate heptahydrate crystals, wherein the seed crystals comprise disodium 5'-guanylate heptahydrate crystals, and
   wherein the adding of the seed crystals is performed while maintaining the temperature at 25° C. to 45° C.

2. The method of claim 1, wherein the aqueous salt solution is at pH of 7 to 10.

3. The method of claim 1, wherein the salt concentration in the aqueous salt solution is 200 g/L to 400 g/L.

4. The method of claim 1, wherein the concentration of 5'-guanylic acid in the aqueous 5'-guanylic acid solution is 50 g/L to 400 g/L.

5. The method of claim 1, wherein the aqueous 5'-guanylic acid solution comprises those obtained by microbial culture.

6. The method of claim 1, wherein the amount of the seed crystals added is 0.1 part by weight to 5.5 parts by weight based on 100 parts by weight of 5'-guanylate.

7. The method of claim 1, further comprising cooling a solution comprising the formed crystals after forming the disodium 5'-guanylate heptahydrate crystals.

8. The method of claim 7, wherein the cooling is performed at 25° C. or lower.

\* \* \* \* \*